United States Patent [19]

Slocum et al.

[11] Patent Number: 5,019,632
[45] Date of Patent: May 28, 1991

[54] POLYMERIZATION OF FLUOROOLEFINS IN PRESENCE OF NON-VOLATILE POLYMERIC SEED

[75] Inventors: Edgar W. Slocum, Wilmington, Del.; Aquiles C. Sobrero, Parkersburg, W. Va.; Robert C. Wheland, Wilmington, Del.

[73] Assignee: E. I. Du Pont de Nemours and Company, Wilmington, Del.

[21] Appl. No.: 399,656

[22] Filed: Aug. 28, 1989

Related U.S. Application Data

[63] Continuation-in-part of Ser. No. 166,484, Mar. 10, 1988, Pat. No. 4,861,845.

[51] Int. Cl.$^5$ .......................... C08F 2/34; C08F 14/18
[52] U.S. Cl. ........................................ 526/68; 526/67; 526/70; 526/88; 526/231; 526/242; 526/247; 526/249; 526/255; 526/919; 525/263; 525/276
[58] Field of Search ................ 526/65, 67, 88, 242, 526/913, 919, 68, 70, 231, 247, 249, 255; 525/53, 54, 263, 276

[56] References Cited

U.S. PATENT DOCUMENTS

| | | | |
|---|---|---|---|
| 2,598,283 | 5/1952 | Miller | 526/255 X |
| 2,753,329 | 7/1956 | Kroll et al. | 526/255 X |
| 3,170,858 | 2/1965 | Muchlberg et al. | 526/255 X |
| 3,304,293 | 2/1967 | Fuhrmann et al. | 526/901 X |
| 3,493,530 | 2/1970 | Sianesi et al. | 526/255 X |
| 3,592,802 | 7/1971 | Scoggins et al. | 526/255 X |
| 4,012,573 | 3/1977 | Trieschmann et al. | 526/68 |
| 4,525,547 | 6/1985 | Kato et al. | 526/68 |
| 4,535,136 | 8/1985 | Wheland | 526/214 |
| 4,588,796 | 5/1986 | Wheland | 526/214 |

FOREIGN PATENT DOCUMENTS 6711121 10/1967 Netherlands ................ 526/247

Primary Examiner—Fred Teskin
Attorney, Agent, or Firm—Donald W. Huntley

[57] ABSTRACT

A free-radical initiated process for preparing fluorinated polymers wherein at least one gaseous fluoroolefin is polymerized in a stirred polymerizer, the improvement comprising preparing a non-volatile polymeric seed in a reaction zone separate from the polymerizer by decomposing initiator in the presence of fluoromonomer to form oligomeric free radicals and condensing said radicals onto previously prepared polymer; and conveying said non-volatile seed to the polymerizer.

19 Claims, 1 Drawing Sheet

POLYMERIZATION OF FLUOROOLEFINS IN PRESENCE OF NON-VOLATILE POLYMERIC SEED

CROSS-REFERENCE TO RELATED APPLICATION

This is a continuation-in-part of U.S. Ser. No. 07/166,484, filed Mar. 10, 1988, now U.S. Pat. No. 4,861,845.

BACKGROUND OF THE INVENTION

1. Field of the Invention

This invention relates to a process and apparatus for polymerizing fluoroolefins in the gas phase.

2. References

Polymerization of tetrafluoroethylene (TFE) in the gas phase in the presence of nonvolatile initiators is known. For example, U.S. No. 3,592,802 discloses gaseous polymerization of TFE at about 40° to 120° C. in the presence of selected di(saturated hydrocarbyl) peroxydicarbonates such as diisopropylperoxydicarbonate, preferably supported on a suitable carrier material such as polytetrafluoroethylene. However, product adhered to the cooling coils. U.S. No. 3,304,293 discloses gas phase polymerization of TFE employing heat-activated gels of silica or silica-alumina admixed with salts of oxy acids of hexavalent chromium, such as magnesium chromate. U.S. No. 3,170,858 discloses gaseous polymerization of TFE, or copolymerization thereof with minor amounts of other fluoroolefins such as hexafluoropropene or vinylidene fluoride, in the presence of previously irradiated TFE homopolymer.

Use of nonvolatile initiators, including fluorinated oligomers, in condensed phase polymerization of TFE is also known. For example, U.S. No. 3,493,530 discloses polymerization of perfluorinated olefins in the presence of macromolecular perfluorinated polyperoxides of the formula $(C_3F_6O_x)_n$ wherein n is an integer of 5 to 100, the initiators being soluble in the liquid polymerization media. The use of TFE/ether- or HFP/ether-peroxide copolymers which are nonvolatile oils as initiators for fluorolefin polymerization is disclosed in Dutch Application No. 6,711,121. U.S. No. 2,598,283 discloses copolymerization of TFE and HFP employing bis-trichloroacetyl peroxide at low temperatures in a perhalogenated hydrocarbon solvent. U.S. Nos. 4,535,136 and 4,588,796 (incorporated herein by reference) disclose solution polymerization of fluoroolefins employing acyl hypofluorite initiators of the formula RCOOF or $X(CF_2)_nCOOF$ wherein R is $X(CF2)_n$—or $CF_3CF_2CF_2O[CF(CF_3)CF_2O]_mCF(CF_3)$—, X is H or F, m is 0 to 50 and n is 1 to 16.

U.S. No. 2,753,329 discloses gaseous polymerization of TFE employing peroxide and peracetate catalysts which reportedly produce a fluidizable, powdery polymer which does not adhere to the reactor walls. Polymerization is carried out at a temperature of about 125° to about 200° C. and a pressure of at least 100 psi (690 kPa). Under these process conditions, more than 99% of the catalyst is said to be present in the vapor phase.

Prior art processes for polymerizing fluoroolefins in the gas phase sometimes employ inert gases or vapors as heat transfer media to remove heat of polymerization. Although recycle of monomers has not been reported for cooling fluoroolefin polymerization, recycle has been employed with non-halogenated monomers. U.S. No. 4,525,547 discloses recycle of unreacted monomers through external heat exchangers to remove heat of polymerization in the gas phase polymerization of ethylene. Copolymerization of ethylene with other alpha-olefins employing a non-volatile (liquid or solid) coordination catalyst, an inert gaseous hydrocarbon diluent, and recycle of unreacted monomers through an external heat-exchanger is disclosed. The process reportedly results in, among other things, "reduced polymer deposition on the inner wall of the polymerization vessel, the prevention of lumpy polymer formation, and the proceeding of uniform copolymerization reaction".

Typical gas phase fluoroolefin polymerization processes of the art result in reactor fouling and plugging requiring frequent and costly shutdowns. Copending U.S. Ser. No. 07/166484, filed Mar. 10, 1988, now U.S. Pat. No. 4,861,845, solves these reactor fouling and plugging problems by utilizing a recycle gas stream heat exchanger to cool unreacted monomer gas. This process adds a non-volatile halogenated free radical source (initiator) directly to the polymerizer. Because the initiator is non-volatile, it is not taken up into the recycle gas stream. While this process is effective, it requires that polymerization occur at a temperature sufficiently high to decompose the initiator selected, which may be too high for avoiding rearrangement of some comonomers (e.g., perfluoro [alkyl vinyl]ethers), leading to unstable end groups in the polymer formed. It also requires use of a non-volatile initiator which is soluble in a non-telogenic solvent so it can be fed to the polymerizer.

SUMMARY OF THE INVENTION

The present invention provides a gas phase fluoroolefin polymerization process that avoids fouling and plugging of polymerizer equipment, allows advantageously low polymerization temperatures, and allows for use of a wide range of polymerization initiators, including both volatile and non-volatile initiators.

More specifically, the subject invention provides a free-radical initiated process for preparing fluorinated polymers wherein at least one gaseous fluoroolefin is polymerized in a stirred polymerizer, the improvement comprising preparing a non-volatile polymeric seed in a reaction zone separate from the polymerizer by decomposing initiator in the presence of fluoromonomer to form oligomeric free radicals and condensing said radicals onto previously prepared polymer; and conveying said non-volatile seed to the polymerizer.

The subject invention also provides a polymerizer apparatus for preparation of a fluorinated polymer wherein at least one gaseous fluoroolefin is polymerized, the improvement comprising (i) means for recycling polymerizing gases through an external heat exchanger, (ii) means for conveying preformed polymer from the polymerizer to a reaction zone separate from the polymerizer, (iii) means for introducing oligomeric free radicals to the polymer under condensation conditions, and (iv) means for conveying resultant polymeric seed back to the polymerizer.

BRIEF DESCRIPTION OF THE DRAWING

The FIG. is a schematic illustration of an apparatus which can be used in the process of the present invention.

DETAILED DESCRIPTION OF THE INVENTION

Figure 1:
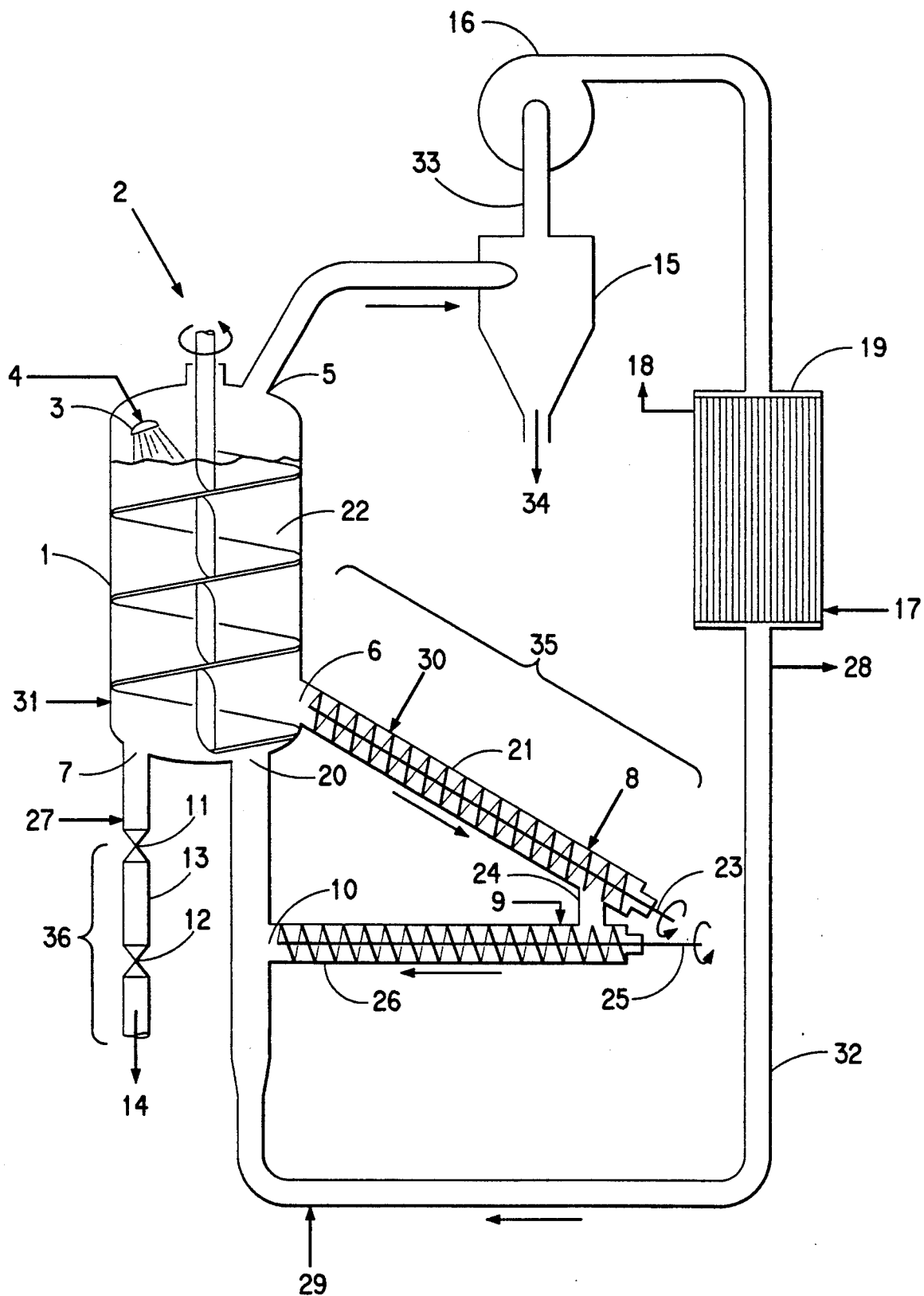

Heat removal in the polymerization of fluoroolefins is especially important for safe control of the reaction. For example, the heat of polymerization of TFE is 37 kcal/mole as compared with 23 kcal/mole for ethylene and 21 kcal/mole for propylene. In the present process, heat of polymerization may be effectively removed by conventional polymerizer wall cooling, or most preferably by continuously recycling a portion of the polymerizer gases through an external heat exchanger.

Initiators commonly used in the free-radical polymerization of fluoroolefins, such as perfluoropropionyl peroxide, as well as the free radicals produced therefrom, are relatively volatile and would therefore, if present in the polymerizer, be taken up in the recycle gases and result in polymerization therein, with subsequent particle agglomeration and fouling of the heat exchanger and other surfaces. In the present process, in a reaction zone separate from the polymerizer vessel, such volatile initiators are decomposed into free radicals, the free radicals are reacted with monomer to form oligomeric free radicals, and the oligomeric free radicals are condensed onto previously formed polymer to form a polymeric seed. The resulting non-volatile polymeric seed is fed to the polymerizer. This process keeps the volatile initiator and resulting free radicals out of the recycle gases. Consequently, polymerization on, and fouling of, cooled heat exchanger surfaces is avoided.

Furthermore, the decomposition temperature of many initiators is relatively high. Because the necessarily high decomposition temperature is confined to the seed generator in the instant invention, the formation and use of a polymeric seed permits polymerization at relatively low temperatures. Certain fluoromonomers, for example, perfluoro(propylvinyl) ether, a preferred comonomer, undergo chain transfer reactions during polymerization which generate undesirable acyl fluoride end groups that can lead to gas, color, and HF formation. Such chain transfer reactions increase with increasing temperature. Thus, such monomers should preferably be polymerized at relatively low temperatures, normally below about 100° C., preferably below about 60° C. Removal of polymerization heat while maintaining adequate productivity at these lower temperatures is achieved by the process of our invention.

"Condensing" mentioned herein is meant to include absorbing, adsorbing, or associating with the preformed polymer so the oligomeric radicals are conveyed into the polymerizer with the polymer in non-volatile form. "Volatile" mentioned herein is meant to describe initiators, free radicals or oligomeric radicals that, if present in the polymerizer, would at least in part be taken up in the recycle gas stream. Previously prepared polymer'- 'or "preformed polymer" mentioned herein is meant to include not only polymer previously prepared in the polymerizer proper of this invention, but any fluoropolymer compatible with the instant polymerization system.

Initiators which are suitable for purposes of the present invention are well known free radical sources, as generally discussed above, for the polymerization of fluoroolefins and may be volatile or non-volatile. Preferred initiators are perhalogenated, most preferably perfluorinated. Among the non-volatile initiators which may be used, those which are especially suitable are $[CF_3(CF_2)_n COO]_2$, wherein n is greater than 8; $[CCl_3COO]_2$; and $[CF_3(CF_2)_2O(CF(CF_3)CF_2O)_xCF(CF_3)CO_2]_2$ where $x>2$. Among the volatile initiators which may be used, those which are especially suitable are $[CF_3(CF)_nCOO]_2$ wherein $n \leq 8$ and $[CF_3(CF_2)_2O(CF(CF_3)CF_2O)_xCF(CF_3)CO_2]_2$ where $x \leq 2$. Perfluoropropionyl peroxide is especially preferred.

Such an initiator is added to previously prepared polymer and monomer in a reaction zone separate from the polymerizer (such a reaction zone is sometimes referred to hereafter as a "seed generator"). The initiator may be added in the vapor phase or dissolved in an inert liquid such as, for example, $CF_2Cl—CFCl_2$ (Freon® 113). The initiator is decomposed to free radicals, and the monomer reacts with the free radicals to form oligomeric free radicals. These oligomers are condensed on the recycle polymer to make non-volatile entities referred to herein as "polymeric seed" which is added to the polymerizer.

The polymerization and seed generation processes can be operated in a temperature range of about 30 to about 200° C. The preferable temperature range for the polymerization is 40 to 80° C. The preferred range in the seed generator depends on the initiator used, with the peak temperature selected such that essentially all of the incoming initiator is converted to nonvolatile seed within the seed generator. With perfluoroacyl peroxide initiators, the preferred temperature range in the seed generator is from 50 to 120° C. Where the temperature of the previously prepared polymer is too low to readily decompose the initiator to free radicals in the seed generator, the previously prepared polymer can be heated by the stripping gas in the stripping section or by other means to a temperature sufficiently high to start the decomposition of the initiator in the initiator section. Reactor pressure may be in the range of about 50 to about 1000 psia (350–6900 kPa), preferably about 200 to about 400 psia (1400–2800 kPa): monomer pressure will account for 25–90% of the total reactor pressure. Of course, as will be evident to those skilled in the art, such temperatures and pressures will be selected depending upon the fluoropolymerization being carried out.

In practicing the subject invention, both the polymerization proper and the polymeric seed generation can be run either as continuous or batch processes. As described in detail below, the Figure depicts the polymerization proper and the seed generation being run as continuous processes; however, as will be apparent to those skilled in the art, so long as the seed generation is carried out in a reaction zone separate from the polymerization proper, the benefits of the instant invention can be realized.

Fluoromonomers operable in the present process will in general be those which are homopolymerizable or copolymerizable by a free-radical mechanism. Such fluoromonomers include perfluoroolefins, particularly tetrafluoroethylene (TFE), perfluoro(alkylvinyl ethers) ($C_{1-4}$ alkyl), perfluoropropene, perfluoro-2,2-dimethyl-1,3-dioxole, perfluoro-2-methylene-4-methyl-1,3-dioxolane, and partially fluorinated monomers, particularly vinylidene fluoride, trifluoroethylene, chlorotrifluoroethylene, and perfluorobutyl ethylene. These fluoromonomers are utilized in the polymerizer proper, as well as in the seed generator. Copolymerization of fluoroolefins, especially TFE, with other monomers is a preferred embodiment of this invention. Especially preferred are the copolymerization of TFE and perfluoropropylvinyl ether (PPVE) wherein the ratio of TFE to PPVE is at least 9 to 1; the copolymerization of TFE and HFP wherein the ratio of HFP to TFE is less than 6 to 1; and the homopolymerization of TFE.

Still other fluoromonomers which can be used in the present process include those fluoroolefins which contain atoms selected for the group Cl, H, and either (—0—).

The amount of fluoroolefin monomer present in the recycle polymer stream in the seed generator is controlled to be in an effective ratio with the initiator which will ultimately react with the monomer. If too little monomer is present, the decomposition of the added initiator will be incomplete because the exotherm is too small, and some undecomposed initiator or volatile oligomeric radicals will travel from the seed generator to the polymerizer and eventually to the recycle system where they may lead to polymer buildup on the polymerizer walls or in the recycle gas system. If too much monomer is present before initiator is added, the temperature will be excessive. Generally, the ratio of initiator to monomer will be selected to maintain the above-mentioned temperature range.

Diluent vapors which are inert under polymerization conditions may optionally be employed to assist in temperature control. Suitable diluents include inert gases such as carbon dioxide, nitrogen or helium, or fluorinated saturated compounds such as sulfur hexafluoride, tetrafluoromethane or hexafluoroethane.

A non-telogenic liquid, preferably halogenated, may be added to the polymerizer to assist in avoiding plugging of the reactor by controlling the morphology of the polymer. Such addition is preferred but is not required for all polymers. The liquid chosen must be non-telogenic, meaning that it does not act as a chain transfer agent that undesirably reduces the molecular weight of the polymer produced; it should wet the polymer, and should be volatile enough to evaporate from the polymer under polymerizer conditions. Examples are 1,1,2-trichlorotrifluoroethane (Freon® 113), perfluoropentane, and HFP cyclic dimer. These halogenated liquids may also be used as a source of the diluent vapors discussed above.

Use of chain transfer agents is contemplated when lower or controlled molecular weight polymers are desired. Suitable agents include vapors having weakly extractable hydrogen or halogen atoms. Examples are hydrogen, methyl chloride or trifluoroacetylchloride.

DESCRIPTION OF THE DRAWING

The Figure is a flow diagram illustrating typical process and apparatus embodiments of the subject invention. In the polymerizer (1) a bed of polymer (22) is mechanically agitated by means of an impeller assembly (2). Alternatively, the bed could be stirred by fluidization by recycle gases. Recycle gases leave the reactor at exit line (5) and flow to a cyclone (15) where the residual fines are removed at fines exit port (34). The rate of gas recycle is adjusted to remove the heat of reaction from the reactor, and the cross sectional area of the reactor is sized such that essentially all of the polymer remains in the reactor with only a small quantity of fines created by attrition being elutriated from the bed. The gas then flows through line (33) to a blower (16), then to a heat exchanger (19) where the heat of reaction is removed by a coolant fluid entering at line (17) and leaving at line (18). The gases then flow back through line (32) to the reactor, entering at port (20). Feed monomers, make-up inert gases, and chain transfer agent can be injected at any convenient point such as port (29).

A side stream of polymer and unreacted monomet is removed from the reactor at port (6), flowing downward through a stripping section (21) of the seed generator (35) and preferably assisted and stirred in its downward motion by a rotating helical ribbon conveyor screw (23). Stripping gas is admitted at port (8). This gas will typically contain a lower concentration of the reactive monomer or monomers than does the gas flowing through the polymerizer so as to limit the total chain length of polymer produced in the seed generator (35) to a small fraction of the ultimate chain length achieved in the polymerizer.

Further, the stripping gas entering at port (8) will ideally contain essentially no chain transfer agent such as may be used in the polymerizer for controlling molecular weight since its presence in the seed generator (35) can be expected to reduce the initiation efficiency. The inert gases introduced at port (8) are typically the same as those used in the polymerizer proper.

The stripping gas can be caused to flow substantially in a direction opposite to that of the polymer in the stripping section (21) by maintaining a powdered polymer seal in the line (24) connecting the stripping section (21) to the initiation section (26), thus maintaining efficient stripping of interstitial reactor gases entering with the polymer at port (6). The polymer leaves the stripping section (21) of the seed generator at port (24), and enters the initiation section (26).. Initiator, either as a pure liquid or gas or as a solution in an inert liquid or gas enters at port (9). Depending on whether the initiator is a gas or a liquid, it either mixes with the interstitial and coflowing gas in the initiator section or is distributed on the surface of the recirculating polymer. The polymer moves along the initiator section (26) of the seed generator under the influence of a rotating helical ribbon conveyor screw (25). A portion of the stripping gas that entered at port (8) passes along the initiator section (26) both as interstitial and bulk gas in coflow with the polymer. As the initiator passes along the initiator section (26) it starts to decompose to free radicals, which react exothermally with the monomer or monomers in the interstitial and coflowing gas, causing the temperature to rise along the initiator section (26). The initiator decomposition rate increases rapidly as the temperature rises. Flow rates of polymer and gas within the initiator section of the seed generator (35) are selected so that a high enough temperature will be achieved within the initiator section to completely convert the initiator to free radicals, which will then react with the monomer or comonomers in the interstitial and coflowing gas to form oligomeric radicals. These oligomeric radicals condense onto the surface of the polymer to form seed, which is then conveyed to port (10) in the recirculating gas line where it is picked up by the recycle gas and conveyed back to the polymerizer at port (20).

Solid polymer product is removed from the polymerizer through a lock hopper system (36) connected to port (7) on the bottom of the polymerizer, which may consist of two ball valves or star valves (11) and (12) (or other means of intermittently stopping the polymer and interstitial gas flow) with a volume (13) between them such that the valves, operating alternately, discharge polymer and gas from the system at port (14). Gas may be added to the downleg of the lock hopper system at port (27) to sweep fine materials back into the polymerizer, permitting the discharge of only the largest particle size grains of polymer. The gas used at port (27) may be part of the recycle cooling gas or could also be an inert gas to sweep reactants out of the intergranular and interstitial zones of the polymer mass. Because the operation of the seed generator (35) requires injection of a gas higher in inert gas composition than that in the polymerizer it will be necessary to vent gas from the system at some suitable point such as port (28) for transport to an inert gas removal system, not shown here, where the monomer or comonomers will be recovered and returned to the process.

The non-telogenic liquid may be added through line (4) to spray head (3) to assist in control of the polymer morphology and to further cool the reactor.

The equipment configuration shown in the Figure describes operation in which the gas is either not cooled below its dew point in heat exchanger (19), or if cooled below that point and thus is a mixture of liquid and gas, contains a sufficiently small quantity of liquid that it can be fed directly to the polymerizer at port (20).

Polymer fines discharged from the cyclone at fines exit port (34) may be reintroduced into the system either by injection of the fines into the seed generator stripping section (21) at port (30) or to a point low in the polymerizer such as port (31), the injection to be accomplished by means obvious to those skilled in the art of conveying particulate solid streams.

EXAMPLES

In the following control experiment and examples, parts are by weight and temperatures are in degrees Celsius unless otherwise indicated.

CONTROL EXPERIMENT

This Control Experiment shows that heavy fouling occurred when volatile perfluoropropionyl peroxide initiator was introduced directly into the polymerizer instead of into the seed generator loop. A 300 ml agitated glass pressure vessel was loaded with 15 g of granular TFE/perfluoropropylvinyl ether (PPVE) copolymer, 115 psia (792 kPa abs.) nitrogen, 200 psia (1380 kPa abs.) TFE (315 psia or 2170 kPa abs. total), and PPVE until the vapor phase analysed 77 weight % TFE, 8 weight % PPVE, and 15 weight % nitrogen by gas phase chromatography. The polymerizer was heated 5 d to 90°–100° C.; the mechanical stirrer started at 205 rpm; gas started circulating gently though the recycle loop consisting of a cyclone, blower, and heat exchanger; and then a 0.21 M solution of perfluoropropionyl peroxide initiator in Freon® 113 fluorocarbon (CF$_2$ClCFCl$_2$) was injected at 2 to 3 mL/h as needed. Within 22 minutes a light-buildup of polymer was noticeable on the walls of the cyclone. After 33 minutes, polymer buildup threatened to close the exit line of the polymerizer. Initiator feed had to be discontinued after 105 minutes. The equipment was shut down and inspected. Parts of the cyclone had 1/16" (1.6 mm) thick deposits of polymer, and the cyclone further retained several large sheets of polymer that appeared to have been detached from a surface. A total of 48.9 grams of new polymer were recoved from the polymerizer and associated parts.

EXAMPLE 1

No Fouling & Low Temperature With Seed Generation TFE Homopolymer

The polymerizer of the Figure was prepared for polymerization by loading with 153.4 g of granular polytetrafluoroethylene, 175 psia (1210 kPa abs.) of tetrafluoroethylene and 140 psia (970 kPa abs.) nitrogen (315 psia or 2170 kPa abs. total). The precharge of granular polymer in the polymerizer was stirred mechanically at 200 rpm. The polymerizer gases were recirculated gently through the cooling loop so that only fines were carried over into the cyclone.

Gas flow and granular polymer circulation were next established in the seed generator (35). The atmosphere in the seed generator was controlled by pumping in a mix 20 mole percent of tetrafluoroethylene and 80 mole percent of nitrogen at 30.4 cc/hr (measured at 1015 psia (6990 kPa abs.) and 25° C.) via port (8) (see Fig.). Polymer was circulated through the seed generator using a single screw feeder performing the functions of conveyor screws (23) and (25) to pull polymer from the base of the polymerizer via stripping section (21) and return the polymer to the gas recycle loop via initiation section (26).

Freon® 113 was introduced at 5 to 8 cc/hr at the top of the polymerizer via port (4) (see Fig.). The introduction of Freon® 113 was found helpful in maintaining a granular product.

Finally 0.3 M perfluoropropionyl peroxide in Freon® 113 was injected into the seed generator via port (9) at 1.0 cc/hr. As the mix was fed to the initiator section an exotherm was observed in initiation section (26). This exotherm was controlled by adjusting the turning rate of the screw feeder.

Reaction was continued for a total of 49.5 minutes. Additional tetrafluoroethylene was added as needed to maintain total pressure from 285 psia (1960 kPa abs.) to 318 psia (2190 kPa abs.). Temperatures within the polymerizer were kept between 54 and 70° C. by the recirculation of gases through the external cooling loop.

At the conclusion of the run, 247.3 g of polymer was isolated for a total of 93.9 g. Productivity was thus 3.0 lbs/gallon/hr (0.36 kg/liter/hour) and 1125 grams of polymer were made for each gram of perfluoropropionyl peroxide initiator injected into the seed generator. None of the polymer trapped in the cyclone showed evidence of physical attachment to the walls.

EXAMPLE 2

No Fouling & Low Temperature With Seed Generation TFE/PPVE Copolymer

The polymerizer of Example 1 was loaded with 150.5 g of granular tetrafluroethylene/perfluoropropylvinylether (TFE/PPVE) copolymer which was stirred mechanically at 200 rpm. The polymerizer was pressured to a total of 315 psia (2170 kPa abs.) with nitrogen, tetrafluoroethylene, and perfluoropropylvinylether, gas chromatographic analysis during the course of polymerization showing typically 65 weight percent TFE, 4.2 weight percent PPVE, and 30.8 weight % nitrogen. These gases were recirculated through the cooling loop so that only fines were seen blowing over.

Gas flow and granular polymer circulation were established in the seed generator (35). A mix of 19.8 mole percent tetrafluoroethylene, 0.2 mole percent PPVE, and 80 mole percent nitrogen was pumped into the seed generator at 30.4 cc/hr measured at 1015 psia (6990 kPa abs.) and 25° C. via port (8) (see Fig.). Polymer was circulated through the seed generator (35) to pull polymer from the base of the polymerizer via stripping section (21) and return the polymer to the gas recycle loop via initiation section (26).

Freon® 113 was introduced at 20 cc/hr at the top of the polymerizer via port (4) (see Fig.). The introduction of Freon® 113 was found helpful in maintaining a granular product.

Finally 0.3 M perfluoropropionyl peroxide in Freon® 113 was injected into the seed generator via port (9) at 1.0 cc/hr. In this run the center of initiation section (26) was maintained at 50 t0 60° C. using an external heater. This gave more uniform reaction in the seed generator.

Reaction was continued for 61 minutes with polymerizer pressure varying between 269 psig (1850 kPa) and 307 psig (2120 kPa) and polymerizer temperature varying between 57° and 60° C. Then essentially all of the polymer in the polymerizer was let down through the lock hopper (36) as a free flowing powder and saved in a receiver. The cyclone (15) showed no adhesive polymeric deposits. Subsequent recovery (see below) of polymer from the receiver along with fines from the cyclone (15) showed a weight gain of about 67 grams. Productivity was 1.73 lbs/gallon/hr (0.21 kg/liter/hour) and 652 grams of polymer were formed per gram of initiator.

Before polymer was actually recovered from the receiver, polymerization was continued for another 87 minutes in the polymerizer. It is interesting to note that while little granular polymer was initially present, working off what was left in the seed generator loop produced a new quantity of free flowing polymer (not isolated) in the polymerizer.

We claim:

1. In a free-radical initiated process for preparing fluorinated polymers wherein at least one gaseous fluoroolefin is polymerized in a stirred polymerizer, the improvement comprising preparing a non-volatile polymeric seed in a reaction zone separate from the polymerizer by decomposing initiator in the presence of fluoromonomer to form oligomeric free radicals and condensing said radicals onto previously prepared polymer; and conveying said non-volatile seed to the polymerizer.

2. In a continuous, free-radical initiated process for preparing fluorinated polymers wherein at least one gaseous fluoroolefin is polymerized in a stirred polymerizer, the improvement comprising (i) removing polymerization heat by recycling initiator-free polymerizer gases through an external heat exchanger, (ii) preparing a non-volatile polymeric seed in a reaction zone separate from the polymerizer by decomposing initiator in the presence of fluoromonomer to form oligomeric free radicals and condensing said radicals onto previously prepared polymer, and (iii) conveying said non-volatile seed to the polymerizer.

3. The process of claim 1 or 2 wherein said initiator is perhalogenated.

4. The process of claim 3 wherein said perhalogenated initiator is perfluoropropionyl peroxide 5. The process of claim 1 or 2 wherein the fluoroolefins are tetrafluoroethylene and perfluoro(propyl vinyl)ether, and the initiator is perfluoropropionyl peroxide.

6. The process of claim 5 wherein a non-telogenic liquid is added to the polymerizer.

7. The process of claim 6 wherein the liquid is selected from 1,1,2-trichlorotrifluoroethane, perfluoropentane and HFP cyclic dimer.

8. The process of claim 1 or 2, wherein a non-telogenic liquid is added to the polymerizer.

9. The process of claim 6 wherein the liquid is selected from 1,1,2-trichlorotrifluoroethane, perfluoropentane and HFP cyclic dimer.

10. The process of claim 1 or 2 in which at least one of the fluoroolefins also contains atoms selected from the group consisting of Cl, H, and ether —O—.

11. The process of claim 1 or 2 in which at least one fluoroolefin is perfluorinated.

12. The process of claim 1 or 2 in which the fluoroolefins are tetrafluoroethylene and perfluoro(propyl vinyl)ether.

13. The process of claim 1 or 2 in which the fluoroolefin is tetrafluoroethylene.

14. The process of claim 1 or 2 in which the temperature of the reaction zone separate from the polymerization is between 30 and 200° C. and the total pressure therein is between 350 and 6900 kPa.

15. The process of claim 1 or 2 in which the initiator is perfluoropropionyl peroxide, the temperature in the polymerizer is 40 to 80° C., the temperature in the reaction zone separate from the polymerizer is 50 to 120° C., and the total pressure is between 1400 and 2800 kPa.

16. The process of claim 1 or 2 in which a controlled amount of a chain transfer gas is added to the polymerizer.

17. The process of claim 16 wherein the chain transfer agent is hydrogen.

18. The process of claim 1 or 2 in which a vapor diluent is present.

19. The process of claim 18 wherein the vapor diluent is selected from carbon dioxide, nitrogen and helium.

* * * * *